United States Patent [19]

Rives

[11] Patent Number: 5,333,978
[45] Date of Patent: Aug. 2, 1994

[54] FASTENER FOR SECURING A LIGHTING OR INDICATING UNIT ON A MOTOR VEHICLE

[75] Inventor: Claude Rives, Evreux, France

[73] Assignee: Valeo Vision, Bobigny Cedex, France

[21] Appl. No.: 62,293

[22] Filed: May 14, 1993

[30] Foreign Application Priority Data

May 14, 1992 [FR] France .................. 92 05859

[51] Int. Cl.⁵ .............................................. F16B 35/00
[52] U.S. Cl. ................................. 411/389; 411/369
[58] Field of Search .................. 411/3, 5, 186, 189, 411/369, 370, 388, 389, 432, 910; 301/352.6, 36.1, 37.37; 362/368

[56] References Cited

U.S. PATENT DOCUMENTS

| | | | |
|---|---|---|---|
| 2,132,571 | 10/1938 | Maney | 411/389 X |
| 2,146,697 | 2/1939 | George | 411/910 X |
| 3,056,443 | 10/1962 | Knocke | 411/186 |
| 4,176,437 | 12/1979 | Scholz et al. | 411/369 X |
| 4,240,670 | 12/1980 | Zorn et al. | 411/432 |
| 4,690,365 | 9/1987 | Miller et al. | 411/389 X |
| 4,753,560 | 6/1988 | Ryder | 411/369 |
| 5,095,411 | 3/1992 | Peck et al. | 362/66 |
| 5,108,238 | 4/1992 | Ewing | 411/5 |

FOREIGN PATENT DOCUMENTS

| | | |
|---|---|---|
| 0399756 | 11/1991 | European Pat. Off. . |
| 2193367 | 2/1974 | France . |
| 471957 | 9/1937 | United Kingdom ............ 301/35.62 |
| 1440808 | 6/1976 | United Kingdom . |
| 2249165 | 4/1992 | United Kingdom . |

Primary Examiner—Neill R. Wilson
Attorney, Agent, or Firm—Morgan & Finnegan

[57] ABSTRACT

A fastener, for fitting a lighting or indicating unit on to a fixed part of a motor vehicle having a hole, comprises a first portion defining a threaded shank adapted to be engaged in the hole and to cooperate with a nut, and a second portion extending from a first end of the threaded shank and adapted to secure the fastener on the lighting or indicating unit. The second portion of the fastener includes an external thread which is essentially coaxial with the threaded shank, and which is adapted to cooperate with a complementary thread provided on the lighting or indicating unit. A spigot is provided on the other, free, end of the threaded shank, this being profiled to enable the fastener to be rotated by a tool so as to drive the thread of the second part into the lighting or indicating unit.

4 Claims, 1 Drawing Sheet

FASTENER FOR SECURING A LIGHTING OR INDICATING UNIT ON A MOTOR VEHICLE

FIELD OF THE INVENTION

The present invention relates in general terms to the fastening of lighting or indicating units on the bodywork or other parts of motor vehicles.

BACKGROUND OF THE INVENTION

Conventionally, the base or body of an indicating light unit, or more generally the fastening of any lighting or indicating unit, on the bodywork of a vehicle, can be carried out using threaded fasteners which are connected to the base and which pass through holes formed in the bodywork, with nuts being engaged on these threaded fasteners to secure them. Such an arrangement is described in French patent specification FR 2 598 201A.

The component which comprises the fastener, in the form of an elongate threaded shank, is generally secured to the base of the unit by moulding of the base on a portion of the fastening member which is distinct from the threaded shank itself, and this can have disadvantages in terms of selling cost.

In addition, the positioning of the nut on the free end of the threaded shank, in order to secure it, has to be done by hand, which imposes a considerable limitation on automation of the operations of fitting indicating units or headlamps.

DISCUSSION OF THE INVENTION

An object of the present is to overcome these drawbacks.

According to the invention in a first aspect, a fastener for securing a lighting or indicating unit of a motor vehicle on to a fixed part of the vehicle, the said fixed part having a hole, the fastener being of the kind comprising a first portion defining a threaded shank adapted to be engaged in the said hole and to cooperate with a nut, together with a second portion extending from a first end of the threaded shank and adapted to secure the fastener to the lighting or indicating unit, is characterised in that the said second portion includes a thread which is substantially coaxial with the threaded shank and which is adapted to cooperate with a complementary thread provided in the lighting and/or indicating unit, and in that a profiled element is provided on the second, free, end of the threaded shank, the said profiled element being such as to enable the fastener to be rotated with the aid of a tool so as to secure it to the lighting or indicating unit by means of the said complementary thread.

Preferably, the said profiled element is a male spigot of a size to enable the nut to pass over it. In that case, it is preferred that the said spigot has an overall dimension which is slightly smaller than the overall internal diameter of the nut, such that the nut is able to be guided thereby in alignment with the threaded shank. This enables the operation of fitting the lighting or indicating unit to be automated.

The fastener preferably further includes, between the said first and second portions, an intermediate portion defining a deformable sealing lip.

According to the invention in a second aspect, a lighting or indicating unit for a motor vehicle, of the type that includes a part defining a base or housing of the unit, is characterised in that it includes at least one element according to the invention in its first aspect, fitted on the said part defining a base or housing.

Further aspects, objects and advantages of the present invention will appear more clearly on a reading of the detailed description of a preferred embodiment of the invention which is given below, by way of example only and with reference to the accompanying drawings.

DESCRIPTION OF A PREFERRED EMBODIMENT OF THE INVENTION

Figure 1:
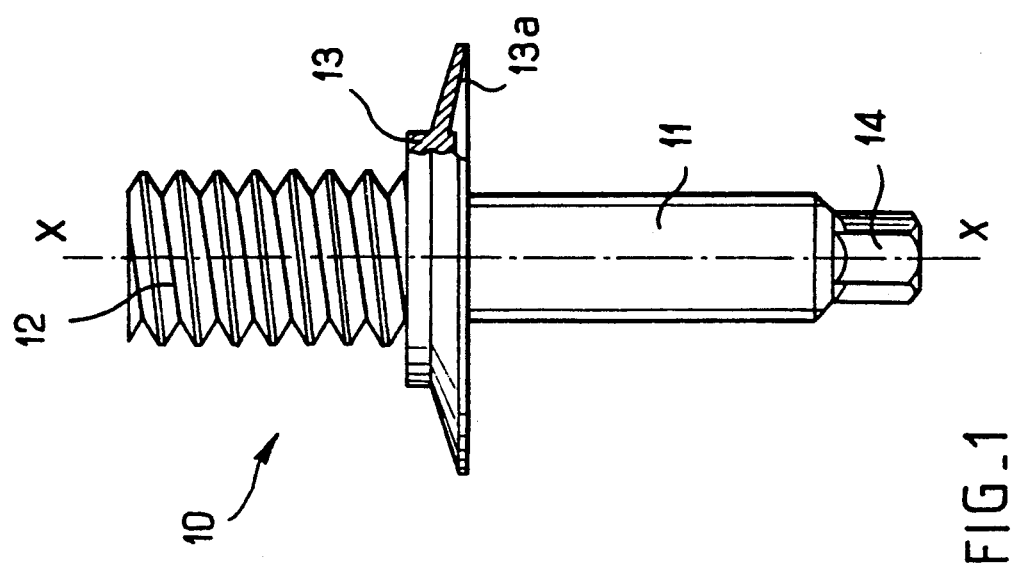
FIG. 1 is a top plan view, partly in cross section, of a fastener according to the invention.

With reference first to FIG. 1, this shows a fastener generally indicated by the reference numeral 10. The fastener has a first main portion comprising a threaded shank 11 having an axis X—X. A second main portion of the element comprises another threaded shank 12, in which at least the diameter, pitch or size of the threads is different from the diameter, pitch or size of the threads in the threaded shank 13. The portions 11 and 12 are separated from each other by a portion which has the general shape of a collar, 13, which defines a thin conical circumferential lip 13a. This lip may be deformed so as to flare it towards the portion 11.

At the free end of the threaded shank 11 remote from the collar 13, there is provided a profiled element which is here in the form of a male spigot 14, for example of the type having six concave faces. The overall diameter of this spigot is smaller than the overall internal diameter of a nut to be engaged on the threaded shank 11, so that the nut can be fitted on the latter. However, preferably the overall diameter of the spigot 14 is only slightly smaller than the overall internal diameter of the nut, so that the latter can be held by the spigot 14 in aligned relationship with the threaded shank 11 before it is screwed on.

Preferably the portions 11, 12, 13 and 14 of the fastener 10 are made integrally with each other, in metal or in a suitable rigid plastics material. In a modification, the portions 11, 12 and 14 are made of metal integrally with each other, while the collar 13 with its deformable lip 13a is a separate component carried by the remainder of the fastener.

Figure 2:
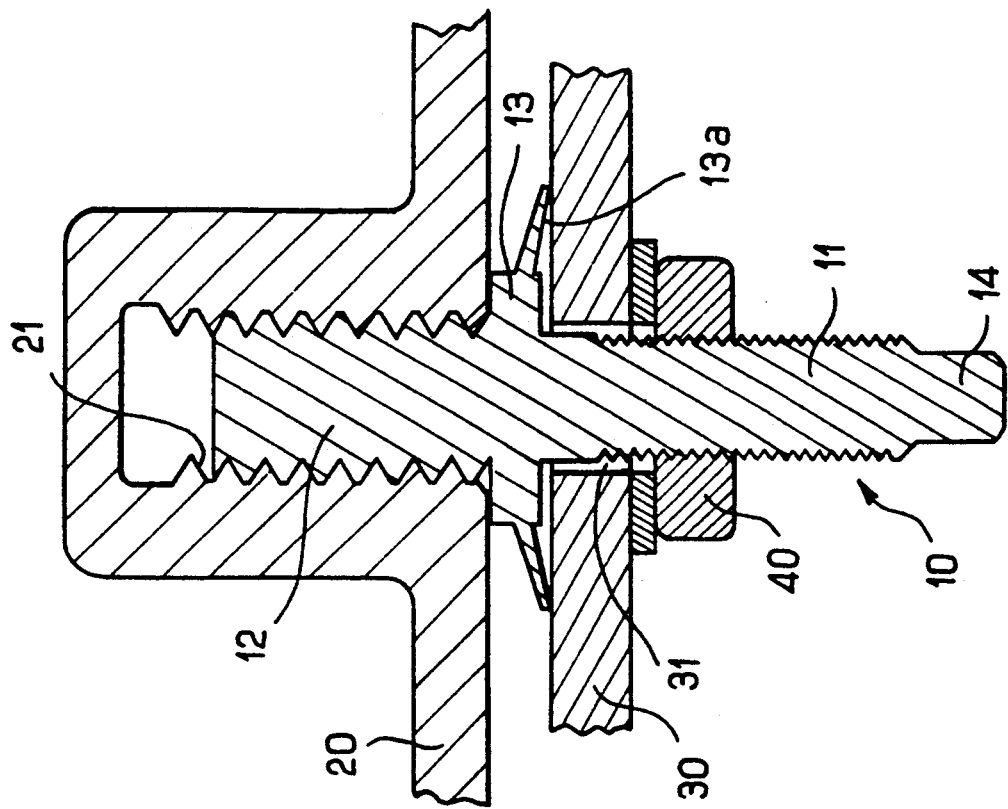
FIG. 2 is a view in horizontal axial cross section of the fastener shown in FIG. 1, fitted on a lighting or indicating unit and on part of the bodywork of a vehicle.

FIG. 2 shows the fastener 10 of FIG. 1 in position. In FIG. 2, the threaded shank 12 is screwed into a complementary threaded socket 21, which is formed in any appropriate way in a base or housing 20 of the lighting or indicating unit. The base 20 may for example be of plastics material: only part of it is shown. The lighting or indicating unit is typically part of a motor vehicle. The threaded shank 12 is screwed into the socket 21 by driving the fastener 10 in rotation about the axis X—X, using a suitable tool (not shown) which has a female socket complementary to the spigot 14.

The lighting or indicating device equipped with the fastener 10 is subsequently so positioned that the threaded shank 11 passes through a hole 31 formed in a part of the bodywork 30 of the vehicle, such as a body panel.

A nut 40 (with a washer interposed if necessary) is then placed over the spigot 14, in abutment against the end of the thread of the shank 11, and is turned so that it is screwed on to the threaded shank 11. When the nut is screwed far enough along the latter to come into contact with the face of the body panel 30 facing towards it, a compressive force is exerted so as to deform the lip 13a elastically, thus ensuring sealing between the opposed sides of the bodywork panel.

It will be noted here that the spigot 14, the diameter of which is chosen to have a particular value as described above, enables the nut to be guided. If necessary, the free axial end face of the spigot 14 may, for this purpose, be rounded or pointed. In this way it becomes possible to ensure that the nut is positioned and screwed into place using an arm of a robot or the like.

When the axis X—X extends horizontally, or is inclined slightly to the horizontal, the spigot 14 may also act as a temporary support for the nut, after the latter has been positioned but before it is applied to the thread of the shank 11.

The present invention is of course in no way limited to the embodiment described above and shown in the drawings: a person skilled in the technical field concerned will be able to apply any variation or modification within the spirit of the invention.

What is claimed is:

1. A fastener for securing a lighting or indicating unit for a motor vehicle on a fixed portion of the vehicle having a hole therethrough, the fastener comprising: a first portion having a threaded shank for engagement in the hole and for cooperation with a nut, said first portion having a first end and a free second end; and a second portion extending from said first end of said threaded shank, said second portion having means for securing the fastener to the unit, said second portion having a thread substantially coaxial with that of said threaded shank for cooperation with a complementary thread formed in the unit, said free second end of said threaded shank having an element which is provided so as to be rotatable by means of a tool, and an intermediate portion, having a thin, conical circumferential deformable sealing lip flared toward said threaded shank between said first and second fastener portions for sealing the hole through the fixed portion of the vehicle.

2. A fastener according to claim 1, wherein said profiled element is a male spigot having a dimension such that said nut can pass over said spigot.

3. A fastener according to claim 2, wherein said spigot has an overall dimension which is slightly smaller than the overall internal diameter of said nut, being that said nut can be guided thereby in alignment with said threaded shank.

4. A lighting or indicating unit for a motor vehicle having a base portion, and a fastener according to claim 1, secured to the base portion by threaded engagement of its said second part in the said base portion.

* * * * *